(No Model.)

D. W. ROGERS.
REFRIGERATOR.

No. 268,538. Patented Dec. 5, 1882.

Witnesses
Chas. H. Smith
J. Haib

Inventor
David W. Rogers
per Lemuel W. Serrell
atty

N. PETERS. Photo-Lithographer, Washington, D. C.

UNITED STATES PATENT OFFICE.

DAVID W. ROGERS, OF PLAINFIELD, NEW JERSEY.

REFRIGERATOR.

SPECIFICATION forming part of Letters Patent No. 268,538, dated December 5, 1882.

Application filed April 17, 1882. (No model.)

*To all whom it may concern:*

Be it known that I, DAVID W. ROGERS, of Plainfield, in the county of Union and State of New Jersey, have invented an Improvement in Refrigerators, of which the following is a specification.

Refrigerators have been made with a central ice-chest with a grating at the bottom, and with spaces around this ice-chest for the reception of vegetables or other articles requiring to be kept cool.

My invention is for the purpose of protecting fruit—such as strawberries—from direct contact with the air that circulates in the refrigerator, and at the same time maintaining a sufficiently cool temperature to prevent the strawberries or other materials becoming injured rapidly in hot-weather. My refrigerator is also adapted to the reception of corned beef or other material in a brine or pickle.

Figure 1:
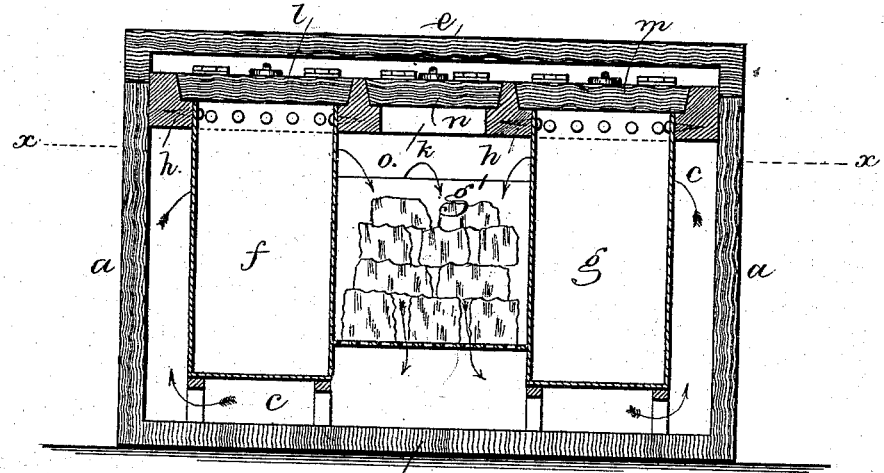
Figure 2:
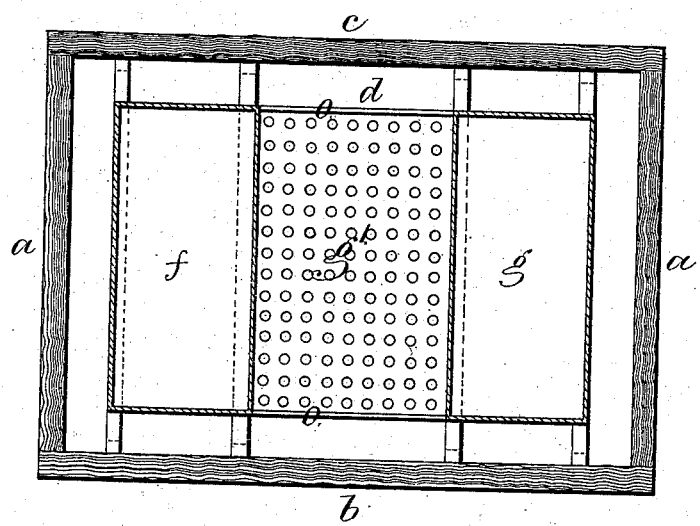

In the drawings, Figure 1 is a vertical section of the refrigerator, and Fig. 2 is a sectional plan at the line $x\ x$.

The refrigerator is made as a box, with sides $a$, front $b$, back $c$, and bottom $d$. These may be made double, if desired, with suitable filling, such as sawdust or charcoal. There should also be a lid, $e$, that covers the entire box, the same being hinged at the back. Within the box there are two metallic boxes, $f$ and $g$, and an ice-chamber, $g'$, between them. These boxes $f$ and $g$ are attached at their upper edges to the frame formed of the cross-pieces $h$ and longitudinal pieces $k$. These pieces $h$ and $k$ intervene between the upper edges of the boxes $f$ and $g$ and the upper edges of the refrigerator-box, so as to firmly connect the parts and leave an air-space all around the boxes $f$ and $g$, and to close those air-spaces tightly at the top.

The cover $l$ to the box $f$, the cover $m$ to the box $g$, and the cover $n$ to the ice-chamber are hinged separately, and close tightly down into the frame $h\ k$. There may be cross-pieces or blocks beneath the boxes $f$ and $g$, between them and the bottom of the refrigerator, for supporting such boxes and their contents.

The ice-chest is made with a grating at the bottom to support the ice, and the wall of the ice-chamber at back and front does not reach as high as the frame $h\ k$. Hence there are openings at $o$, through which the warmer air can enter the ice-chest and circulate downward through such chest and out beneath the boxes $f$ and $g$ and up around them, thus keeping the contents of said boxes cool without the circulating air coming into contact with the contents of such boxes. This is of great importance in preserving the flavor of strawberries and fruits. The ice, coming into contact with the outside of the metal boxes $f$ and $g$ at one side of each, insures a sufficiently low temperature, and either box may be opened without opening the other, or without allowing the escape of air from the ice-chamber.

If desired, the metal boxes $f\ g$, or either of them, may have an opening and door at one side to give access to the same, in which instance the air-circulation will still be around such boxes in the spaces between said boxes and the external refrigerator box or case.

I am aware that refrigerators have been made in which the ice has been inserted into separate sheet-metal tanks; also, that metal and wooden receptacles have been made for the provisions. In some instances the ice crate or box has been between these receptacles, and in other instances it has been at one end of the refrigerator, and the receptacles have been suspended from their upper ends. In my refrigerator the ice is between the metal boxes, and comes close to one side of each, so as to cool the same, and provision is made for the air to circulate in each direction around the boxes.

I claim as my invention—

The combination, with the metal boxes $f\ g$ and a separate cover for each, of the intermediate ice-chambers, a frame around the upper parts of the ice-chamber and boxes $f\ g$, and an exterior refrigerator-box, there being air-spaces between the boxes $f$ and $g$ and the exterior box and circulating-openings at $o$, substantially as specified.

Signed by me this 11th day of April, A. D. 1882.

D. W. ROGERS.

Witnesses:
  GEO. T. PINCKNEY,
  HAROLD SERRELL.